United States Patent
Ohmori (10) Patent No.: US 12,240,493 B2
(45) Date of Patent: Mar. 4, 2025

(54) VEHICLE CONTROLLER, COMPUTER-READABLE MEDIUM STORING VEHICLE CONTROL PROGRAM, AND VEHICLE CONTROL METHOD

(71) Applicants: ADVICS CO., LTD., Kariya (JP); J-QUAD DYNAMICS INC., Tokyo (JP); DENSO CORPORATION, Kariya (JP); AISIN CORPORATION, Kariya (JP); JTEKT Corporation, Kariya (JP)

(72) Inventor: Yosuke Ohmori, Tokyo (JP)

(73) Assignees: ADVICS CO., LTD., Kariya (JP); J-QUAD DYNAMICS INC., Tokyo (JP); DENSO CORPORATION, Kariya (JP); AISIN CORPORATION, Kariya (JP); JTEK Corporation, Kariya (JP)

( * ) Notice: Subject to any disclaimer, the term of this patent is extended or adjusted under 35 U.S.C. 154(b) by 220 days.

(21) Appl. No.: 18/159,992

(22) Filed: Jan. 26, 2023

(65) Prior Publication Data

US 2023/0242146 A1    Aug. 3, 2023

(30) Foreign Application Priority Data

Jan. 31, 2022    (JP) .................................. 2022-013224

(51) Int. Cl.
*B60W 30/02*    (2012.01)
*B60W 10/18*    (2012.01)
(Continued)

(52) U.S. Cl.
CPC .......... *B60W 60/001* (2020.02); *B60W 10/18* (2013.01); *B60W 10/20* (2013.01);
(Continued)

(58) Field of Classification Search
CPC .... B60W 10/18; B60W 10/20; B60W 30/045; B60W 30/18145; B60W 40/103;
(Continued)

(56) References Cited

U.S. PATENT DOCUMENTS 11,318,924 B1 *   5/2022   Kapoor ................ B60K 17/354
2004/0074693 A1 * 4/2004   Mattson ............... B60W 10/20
                                                        180/446
(Continued)

FOREIGN PATENT DOCUMENTS

JP          2020157890 A       10/2020

*Primary Examiner* — Erick R Solis
(74) *Attorney, Agent, or Firm* — BUCHANAN INGERSOLL & ROONEY PC (57) ABSTRACT

A vehicle includes a sideslip preventing function of preventing a sideslip of the vehicle by separately adjusting a longitudinal force applied to each of the wheels. A controller controls the vehicle based on requests input from a driver assistance device, thereby causing the vehicle to travel autonomously. The controller calculates wheel lateral force request values based on the requests input from the driver assistance device. The wheel lateral force request values are request values of lateral forces acting on the respective wheels. The controller, when a behavior of the vehicle is in an oversteer state in a case in which the sideslip preventing function is failing, limits the wheel lateral force request values for the front wheels to values less than or equal to a first lateral force limit value, which is a limit value of the lateral force that can act on the rear wheels.

7 Claims, 3 Drawing Sheets

(51) Int. Cl.
*B60W 10/20* (2006.01)
*B60W 30/045* (2012.01)
*B60W 30/18* (2012.01)
*B60W 40/103* (2012.01)
*B60W 40/109* (2012.01)
*B60W 40/114* (2012.01)
*B60W 60/00* (2020.01)

(52) U.S. Cl.
CPC .... *B60W 30/045* (2013.01); *B60W 30/18145* (2013.01); *B60W 40/103* (2013.01); *B60W 40/109* (2013.01); *B60W 40/114* (2013.01); *B60W 2520/105* (2013.01); *B60W 2520/125* (2013.01); *B60W 2520/14* (2013.01); *B60W 2520/20* (2013.01)

(58) Field of Classification Search
CPC ............. B60W 40/109; B60W 40/114; B60W 2520/105; B60W 2520/125; B60W 2520/14; B60W 2520/20; B60W 2520/403; B60W 2520/406
USPC ... 701/41, 43, 48, 71, 72, 76, 82–84, 90, 92
See application file for complete search history.

(56) References Cited

U.S. PATENT DOCUMENTS

| | | | |
|---|---|---|---|
| 2016/0264135 A1* | 9/2016 | Yamakado | B62D 15/0265 |
| 2017/0259817 A1* | 9/2017 | Horiguchi | B60W 50/082 |
| 2019/0217854 A1* | 7/2019 | Park | B60W 30/045 |
| 2020/0247394 A1* | 8/2020 | Arima | B60W 10/184 |
| 2020/0307551 A1 | 10/2020 | Horiguchi et al. | |
| 2020/0369267 A1* | 11/2020 | Kashiwamura | B60W 60/0051 |
| 2022/0185249 A1* | 6/2022 | Nakagawa | B60W 60/001 |
| 2022/0227354 A1* | 7/2022 | Hagiwara | B60T 8/1755 |
| 2023/0105572 A1* | 4/2023 | Asadi | B60W 10/20 701/41 |

\* cited by examiner

Fig.5

VEHICLE CONTROLLER, COMPUTER-READABLE MEDIUM STORING VEHICLE CONTROL PROGRAM, AND VEHICLE CONTROL METHOD

BACKGROUND

1. Field

The present disclosure relates to a vehicle controller used in a vehicle that travels autonomously, a computer-readable medium storing a vehicle control program, and a vehicle control method.

2. Description of Related Art

A driver assistance device that causes a vehicle to travel autonomously has been known. Japanese Laid-Open Patent Publication No. 2020-157890 discloses a controller that prevents continuation of an unstable behavior of a vehicle traveling autonomously. The controller disclosed in the publication is configured to perform a behavior stabilizing control for ending an unstable state. Specifically, when the behavior of a vehicle is in an oversteer state or an understeer state, the behavior stabilizing control generates a yaw moment in the vehicle by generating a braking force difference between the inner and outer wheels of the turning vehicle. The publication further discloses a configuration that reduces the vehicle speed when the behavior of the vehicle continues even after the behavior stabilizing control is performed.

According to the friction circle theory, the following is true about a case in which a force in a direction of reducing the vehicle speed is applied to the wheels in order to reduce the vehicle speed. Increasing the force in the direction of reducing vehicle speed reduces the lateral force that can be applied to the wheels without causing the wheels to skid. For this reason, while the force in the direction of reducing the vehicle speed is increased during turning of the vehicle, it may be impossible to generate a lateral force sufficient to stabilize the vehicle. In other words, it is difficult to end an unstable state of the vehicle behavior while a force in the direction of reducing the vehicle speed is increased.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a first general aspect, a vehicle controller is configured to control a vehicle based on a request input from a driver assistance device that assists traveling of the vehicle, thereby causing the vehicle to travel autonomously. The vehicle includes the driver assistance device, wheels including front wheels and rear wheels, a drive actuator and a brake actuator that generate a longitudinal force that acts in a longitudinal direction of the vehicle, and a steering actuator that adjusts a tire angle. The tire angle is a steered angle of each of the wheels. The vehicle controller includes a state quantity calculating unit configured to calculate state quantities including a yaw rate of the vehicle, a wheel request generating unit, and an instruction value generating unit. The wheel request generating unit is configured to calculate wheel lateral force request values based on the request. The wheel lateral force request values is request values of lateral forces acting on the respective wheels. The instruction value generating unit is configured to output an instruction value that controls the steering actuator based on the wheel lateral force request values. The vehicle includes a sideslip preventing function of preventing a sideslip of the vehicle by separately adjusting a longitudinal force applied to each of the wheels. The wheel request generating unit is configured to, when the state quantities indicate that a behavior of the vehicle is in an oversteer state in a case in which the sideslip preventing function is failing, calculate a first lateral force limit value, which is a limit value of a lateral force that can act on the rear wheels, and limit a front wheel lateral force request value to a magnitude less than or equal to the first lateral force limit value, the front wheel lateral force request value being the wheel lateral force request value for the front wheels.

In a second general aspect, a non-transitory computer-readable medium stores a vehicle control program that causes a controller of a vehicle to execute an assistance control that controls the vehicle based on a request output by a driver assistance device that assists traveling of the vehicle, thereby causing the vehicle to travel autonomously. The vehicle includes the driver assistance device, wheels including front wheels and rear wheels, a drive actuator and a brake actuator that generate a longitudinal force that acts in a longitudinal direction of the vehicle, and a steering actuator that adjusts a tire angle. The tire angle is a steered angle of each of the wheels. The vehicle includes a sideslip preventing function of preventing a sideslip of the vehicle by separately adjusting a longitudinal force applied to each of the wheels. The vehicle control program is configured to cause the controller to execute a state quantity calculating process that calculates state quantities including a yaw rate of the vehicle, a wheel request generating process that calculates wheel lateral force request values based on the request, the wheel lateral force request values being request values of lateral forces acting on the respective wheels, and an instruction value generating process that outputs an instruction value that controls the steering actuator based on the wheel lateral force request values. The wheel request generating process includes, when the state quantities indicate that a behavior of the vehicle is in an oversteer state in a case in which the sideslip preventing function is failing, calculating a first lateral force limit value, which is a limit value of a lateral force that can act on the rear wheels, and limiting a front wheel lateral force request value to a magnitude less than or equal to the first lateral force limit value, the front wheel lateral force request value being the wheel lateral force request value for the front wheels.

In a third general aspect, a vehicle control method controls a vehicle based on a request output by a driver assistance device that assists traveling of the vehicle, thereby causing the vehicle to travel autonomously. The vehicle includes the driver assistance device, wheels including front wheels and rear wheels, a drive actuator and a brake actuator that generate a longitudinal force that acts in a longitudinal direction of the vehicle, and a steering actuator that adjusts a tire angle. The tire angle is a steered angle of each of the wheels. The vehicle includes a sideslip preventing function of preventing a sideslip of the vehicle by separately adjusting a longitudinal force applied to each of the wheels. The vehicle control method includes: a state quantity calculating process that calculates state quantities including a yaw rate of the vehicle; a wheel request generating process that calculates wheel lateral force request values based on the request, the wheel lateral force request values being request values of lateral forces acting on the respective wheels; and an instruction value generating process that outputs an instruction value that controls the steering actuator based on the wheel lateral force request values. The wheel request generating process includes, when the state quantities indicate that a behavior of the vehicle is in an oversteer state in a case in which the sideslip preventing function is failing, calculating a first lateral force limit value, which is a limit value of a lateral force that can act on the rear wheels, and limiting a front wheel lateral force request value to a magnitude less than or equal to the first lateral force limit value, the front wheel lateral force request value being the wheel lateral force request value for the front wheels.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A controller 10, which is a vehicle controller according to one embodiment, will now be described with reference to FIGS. 1 to 5.

Figure 1:
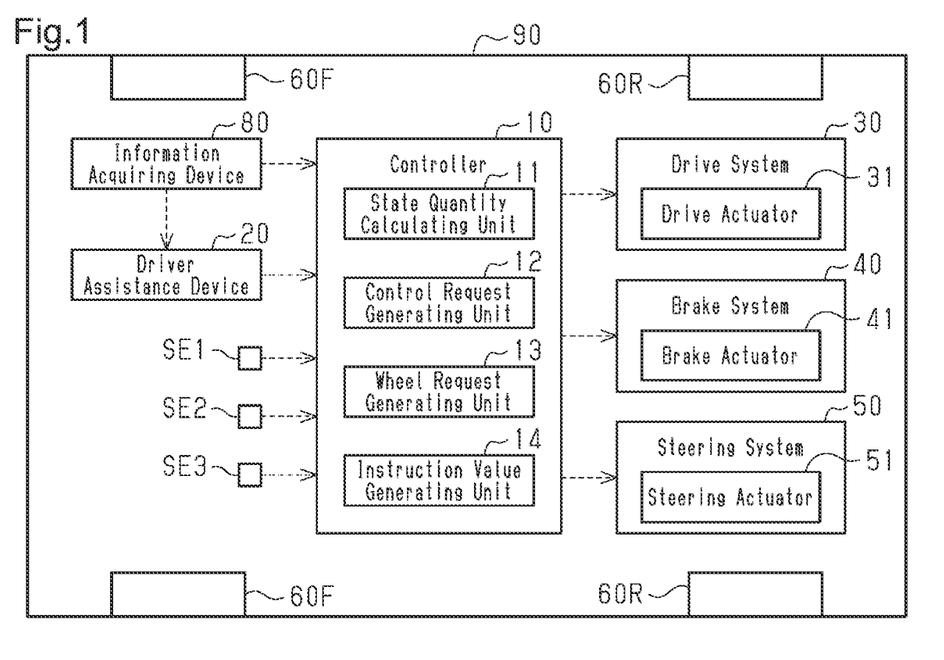
FIG. 1 is a block diagram showing a vehicle controller according to one embodiment and a vehicle controlled by the controller.

FIG. 1 shows the controller 10 and a vehicle 90 in which the controller 10 is used. The vehicle 90 includes a driver assistance device 20 that assists traveling of the vehicle 90. The controller 10 controls the vehicle 90 based on requests input from the driver assistance device 20, thereby performing an assistance control for causing the vehicle 90 to travel autonomously. In the present embodiment, the assistance control will be described as a control for causing the vehicle 90 to move forward.

<Vehicle>

The vehicle 90 includes, for example, four wheels including two front wheels 60F and two rear wheels 60R.

As shown in FIG. 1, the vehicle 90 includes a drive system 30, which transmits driving force to the wheels. The drive system 30 includes a drive actuator 31 that generates driving force. The vehicle 90 includes a motor-generator as an example of the drive actuator 31. The motor-generator generates driving force by being caused to function as an electric motor. The drive actuator 31 may be an internal combustion engine. The drive actuator 31 may include a motor-generator and an internal combustion engine. Another example of the drive actuator 31 is a wheel hub motor.

The drive system 30 is, for example, configured to transmit driving force to all the wheels. The drive system 30 may be configured to transmit driving force only to the front wheels 60F, or may be configured to transmit the driving force only to the rear wheels 60R.

The vehicle 90 includes a brake system 40, which applies braking force to the wheels. The brake system 40 includes a brake actuator 41, which generates braking force. The brake actuator 41 includes, for example, a friction braking device and a regenerative braking device.

The friction braking device may be a hydraulic braking device. The friction braking device includes braking mechanisms corresponding to the respective wheels. Each braking mechanism includes a rotor, which rotates integrally with the wheel, a frictional member, which is pressed against the rotor, and a wheel cylinder, which presses the friction member against the rotor in response to hydraulic pressure. An example of the braking mechanism is a disc brake. The braking mechanism may be a drum brake. Another example of the friction braking device is an electric braking device that mechanically transmits driving force of an electric motor to press a friction member against a rotor.

An example of the regenerative braking device is the motor-generator described above. The motor-generator generates regenerative braking force applied to the wheels by being caused to function as a generator. Another example of the regenerative braking device is a wheel hub motor.

Controls that are performed by the brake system 40 include a regenerative cooperative control. The regenerative cooperative control is a control for causing a desired braking force to act on the vehicle 90 through cooperation of regenerative braking force generated by the regenerative braking device and frictional braking force generated by the frictional braking device.

The brake actuator 41 of the brake system 40 does not necessarily need to include a friction braking device and a regenerative braking device. The brake actuator 41 may include only a friction braking device. Alternatively, the brake actuator 41 may include only a regenerative braking device.

The vehicle 90 includes a steering system 50. The steering system 50 adjusts tire angles, which are steered angles of the wheels. The steering system 50 includes a steering actuator 51 that steers the wheels. For example, the vehicle 90 includes a front wheel steering device as the steering actuator 51. The front wheel steering device is a steering device that changes the tire angle of only the front wheels 60F.

The vehicle 90 may include, as the steering actuator 51, a rear wheel steering device, which changes the tire angle of only the rear wheels 60R. In the vehicle 90 in which the steering system 50 includes a front wheel steering device and a rear wheel steering device, the tire angle of the front wheels 60F and the tire angle of the rear wheels 60R can be changed separately.

The drive system 30 may include a drive controller including processing circuitry that controls the drive system 30. The brake system 40 may include a braking controller including processing circuitry that controls the brake system 40. The steering system 50 may include a steering controller including processing circuitry that controls the steering system 50. The processing circuitry includes, for example, a memory that stores programs and a CPU that executes various processes according to the programs in the memory. The drive controller, the braking controller, and the steering controller receive instruction values generated by an instruction value generating unit 14, which will be discussed below.

<Longitudinal Force>

Longitudinal force will now be described. The longitudinal force refers to a force acting in the longitudinal direction of the vehicle 90. When the longitudinal force has a positive value, the longitudinal force is a force in a direction of accelerating the vehicle 90. When the longitudinal force has a negative value, the longitudinal force is a force in a direction of decelerating the vehicle 90. As the value of the longitudinal force becomes further away from 0, the longitudinal force applied to the vehicle 90 increases. That is, as the longitudinal force increases, the force applied to the vehicle 90 increases. The drive actuator 31 and the brake actuator 41 are actuators that generate the longitudinal force. The sum of the driving force and the braking force corresponds to the longitudinal force. The drive actuator 31 and the brake actuator 41 are collectively referred to as a longitudinal force actuator.

<Lateral Force>

Lateral force will now be described. The lateral force refers to a force acting in a lateral direction of the vehicle 90. The lateral force is generated in each wheel according to the tire angle in the vehicle 90 during turning. The steering actuator 51 is an actuator that generates the lateral force. When the lateral force has a positive value, the lateral force is a leftward force. When the lateral force has a negative value, the lateral force is a rightward force. As the value of the lateral force becomes further away from 0, the lateral force applied to the wheel is increased. That is, as the lateral force increases, the force applied to the wheel increases.

<Vehicle Behavior Control>

The vehicle 90 may have a function of controlling the behavior of the vehicle 90. The vehicle behavior controlling function is implemented, for example, by at least one of the drive system 30, the brake system 40, and the steering system 50. That is, the vehicle behavior controlling function is implemented by the processing circuitry of the vehicle 90. The vehicle behavior controlling function is implemented by a CPU executing programs stored in the memory of the processing circuitry. One example of the vehicle behavior controlling function is a sideslip preventing function. The vehicle behavior controlling function may include functions of executing an antilock braking control, a traction control, an electric power steering control, a rear wheel steering control, and a direct yaw moment control.

The sideslip preventing function is a function of preventing sideslip of the vehicle 90 by reducing a skid amount of the wheels when the vehicle 90 is turned. Specifically, the sideslip preventing function is executed separately for each wheel in order to adjust the longitudinal force applied to the wheel by adjusting at least one of the driving force and the braking force. For example, the sideslip preventing function uses mechanisms that individually adjust the longitudinal force generated by the longitudinal force actuator for the respective wheels. When an anomaly occurs in such a mechanism, the sideslip preventing function may fail. A failure of the sideslip preventing function is also regarded as an anomaly of the longitudinal force adjusting system (the drive system 30 and the brake system 40) executing the sideslip preventing function.

The antilock braking control reduces the skid amount of the wheels through adjustment of the braking force when braking the vehicle 90, thereby preventing the wheels from being locked. The traction control prevents the wheels from spinning by suppressing acceleration skid of the drive wheels.

The electric power steering control assists operation of the steering operating member by the driver of the vehicle 90. The rear wheel steering control adjusts the tire angle of the rear wheels 60R by operating the rear wheel steering device. The direct yaw moment control controls the yaw moment of the vehicle 90 by generating a difference in longitudinal force between the left and right wheels by controlling at least one of the braking force and the driving force.

<Information Acquiring Device>

The vehicle 90 may include an information acquiring device 80.

The information acquiring device 80 acquires information regarding the surroundings of the vehicle 90. The information acquiring device 80 acquires relative distances from the vehicle 90 to other vehicles and obstacles in the vicinity. The information acquiring device 80 also acquires the shape of the road on which the vehicle 90 is traveling and recognizes lanes. An example of the information acquiring device 80 is a camera. An example of the information acquiring device 80 is a detection device such as a LiDAR or a millimeter wave radar.

Another example of the information acquiring device 80 is a global navigation satellite (GNSS) receiver, which receives signals from positioning satellites. The information acquiring device 80 identifies the current position of the vehicle 90 based on signals received by the GNSS receiver.

The information acquiring device 80 may include one of the above-described devices or may include two or more of the above-described devices. The information acquiring device 80 may include processing circuitry that processes the acquired information.

The information acquiring device 80 outputs the acquired information to the controller 10. The information acquiring device 80 also outputs the acquired information to the driver assistance device 20.

The information acquiring device 80 does not necessarily need to be located in the vehicle 90. If the information acquiring device 80 is located outside and separately from the vehicle 90, the vehicle 90 may include an additional device that receives signals from the information acquiring device 80. In this case, the controller 10 and the driver assistance device 20 still can use information regarding the surroundings of the vehicle 90.

<Driver Assistance Device>

The driver assistance device 20 includes processing circuitry that sets a traveling route for causing the vehicle 90 to drive autonomously. The driver assistance device 20 sets a traveling route, for example, based on information acquired by the information acquiring device 80. The driver assistance device 20 outputs, as a travel request, a request for causing the vehicle 90 to drive along the traveling route.

The travel request includes, for example, a target value of the yaw rate and a target value of the longitudinal acceleration. The travel request may include a target position of the vehicle 90 and a target value of the vehicle speed. The travel request may include a priority degree that indicates which of braking of the vehicle 90 and turning of the vehicle 90 is prioritized. For example, when a degree of priority of braking is 50% and a degree of priority of turning is 50%, neither braking nor turning is given priority. For example, when the degree of priority of braking is 60% and the degree of priority of turning is 40%, braking is prioritized. For example, when the degree of priority of braking is 70% and the degree of priority of turning is 30%, braking is given higher priority than in the example in which the degree of priority of braking is 60%.

<Various Sensors>

The vehicle 90 includes various sensors. FIG. 1 shows, as examples of various sensors, a yaw rate sensor SE1, an acceleration sensor SE2, and a wheel speed sensor SE3. Detection signals from the various sensors are input to the controller 10.

The yaw rate sensor SE1 detects the yaw rate of the vehicle 90.

The acceleration sensor SE2 includes a longitudinal acceleration sensor, which detects the longitudinal acceleration of the vehicle 90, and a lateral acceleration sensor, which detects the lateral acceleration of the vehicle 90.

The wheel speed sensor SE3 detects a wheel rotation speed. The wheel speed sensor SE3 is provided in each wheel.

<Controller>

The controller 10 includes processing circuitry that controls the drive system 30, the brake system 40, and the steering system 50. The controller 10 includes a central processing unit (CPU) and a read-only memory (ROM). The ROM of the controller 10 stores various programs that cause the CPU to execute various control processes.

The controller 10 is connected to the drive controller, the braking controller, and the steering controller. Information is transferred among the controller 10, the drive controller, the braking controller, and the steering controller.

The controller 10 includes multiple functioning units that perform various controls. FIG. 1 shows, as examples of functioning units, a state quantity calculating unit 11, a control request generating unit 12, a wheel request generating unit 13, and an instruction value generating unit 14. The functioning units in the controller 10 transfer information to and from each other.

<State Quantity Calculating Unit>

The state quantity calculating unit 11 calculates vehicle state quantities.

In the following description, suffixes attached to symbols representing various state quantities each indicate which of the wheels of the vehicle 90 that symbol corresponds to. Specifically, the suffixes fl, fr, rl, and rr correspond to the left front wheel, the right front wheel, the left rear wheel, and the right rear wheel, respectively. When attached to a symbol representing a state quantity, the suffix ** indicates that the symbol is a generic symbol corresponding to the respective wheels. When attached to a symbol representing a state quantity, the suffix f* indicates that the symbol is a generic symbol corresponding to the two front wheels 60F. When attached to a symbol representing a state quantity, the suffix r* indicates that the symbol is a generic symbol corresponding to the two rear wheels 60R.

Exemplary vehicle state quantities calculated by the state quantity calculating unit 11 will now be described.

The state quantity calculating unit 11 calculates a yaw rate $\gamma$ based on a detection signal from the yaw rate sensor SE1.

The state quantity calculating unit 11 calculates a longitudinal acceleration Gx and a lateral acceleration Gy based on detection signals from the acceleration sensor SE2.

The state quantity calculating unit 11 calculates a wheel rotation speed Vw of each wheel based on a detection signal from each wheel speed sensor SE3. The state quantity calculating unit 11 calculates the vehicle speed Vx based on the wheel rotation speeds Vw of the wheels. The vehicle speed Vx represents a traveling speed of the vehicle 90.

The state quantity calculating unit 11 also calculates the longitudinal force and the lateral force acting on each wheel. The state quantity calculating unit 11 calculates the sum of the lateral forces acting on all the wheels based on, for example, the weight m of the vehicle 90, the height of the center of gravity of the vehicle 90, the lateral acceleration Gy, and the like. The state quantity calculating unit 11 calculates the lateral force acting on each wheel from the total value of the lateral forces while taking into consideration the division ratio to the respective wheel.

The state quantity calculating unit 11 calculates a road surface friction coefficient $\mu^{}$ of each wheel. The road surface friction coefficient $\mu^{}$ is calculated, for example, based on the lateral acceleration Gy.

The state quantity calculating unit 11 calculates a vertical load road surface w of each wheel. The vertical load w is calculated based on, for example, the weight m of the vehicle 90, the longitudinal acceleration Gx, the lateral acceleration Gy, and the like.

<Request Generating Unit>

The control request generating unit 12 generates a vehicle request, which is a request to the vehicle 90, based on a request input from the driver assistance device 20. The control request generating unit 12 calculates, for example, a vehicle longitudinal force request value Fx, which is a request value of the longitudinal force in the vehicle 90. The control request generating unit 12 calculates, for example, a request moment Mz, which is a request value of the moment acting on the vehicle 90. The request moment Mz is expressed by the product of a yaw inertia moment and the time derivative value of the yaw rate. The control request generating unit 12 calculates a vehicle lateral force request value Fy, which is a request value of the lateral force in the vehicle 90.

The wheel request generating unit 13 executes a wheel request generating process. The wheel request generating process generates a wheel request, which is a request to each wheel, based on the vehicle request. For example, the wheel request generating unit 13 divides the vehicle longitudinal force request value Fx among the respective wheels to calculate wheel longitudinal force request values Fx, which are requests values of the longitudinal force to be applied to the respective wheels. The wheel request generating unit 13 divides the request moment Mz among the respective wheels to calculate wheel lateral force request values Fy, which are request values of the lateral force to be applied to the respective wheels. The wheel lateral force request values Fy can be also calculated based on the vehicle lateral force request value Fy. As will be described in detail below, the wheel request generating unit 13** also corrects the vehicle request when generating the wheel request.

<Instruction Value Generating Unit>

The instruction value generating unit 14 generates an instruction value for operating actuators based on the wheel request. Specifically, the instruction value generating unit 14 calculates an instruction value for controlling the drive actuator 31 and an instruction value for controlling the brake actuator 41 based on the wheel longitudinal force request values $Fx^{}$. The instruction value generating unit 14 calculates an instruction value for controlling the steering actuator 51 based on the wheel lateral force request values $Fy^{}$.

The instruction value generating unit 14 outputs the calculated instruction values. The instruction values are each input to the corresponding one of the drive system 30, the brake system 40, and the steering system 50. The drive system 30, the brake system 40, and the steering system 50 each operate its own actuator based on the corresponding instruction value. For example, in the brake system 40 that has received the instruction value, the braking controller operates the brake actuator 41 in accordance with the instruction value.

<Instruction Value Generating Process>

The controller 10 executes an instruction value generating process for performing an assistance control of the vehicle 90. This process will now be described with reference to FIGS. 2 and 3. The ROM in the controller 10 stores a vehicle control program for executing the processes shown in FIGS. 2 and 3. The processes shown in FIGS. 2 and 3 are implemented by the CPU executing the vehicle control programs stored in the ROM.

Figure 2:
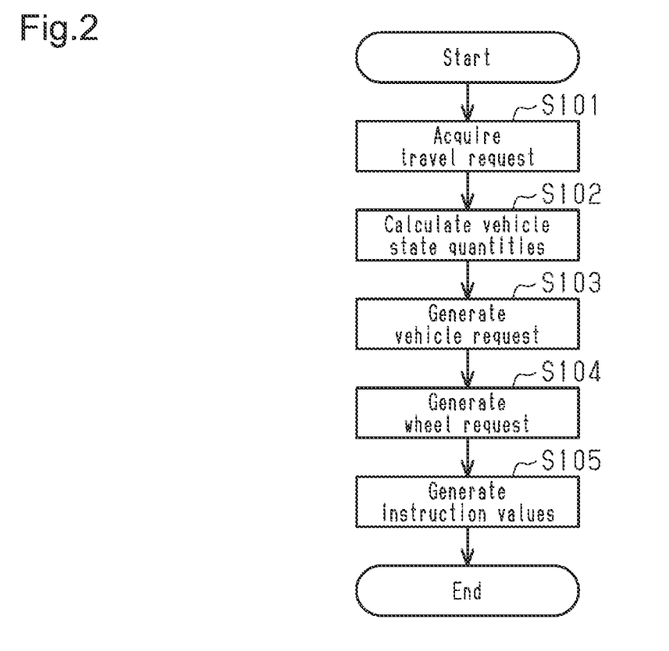
FIG. 2 is a flowchart showing the procedure of processes executed when the vehicle controller shown in FIG. 1 performs an assistance control for causing the vehicle to travel autonomously.
Figure 3:
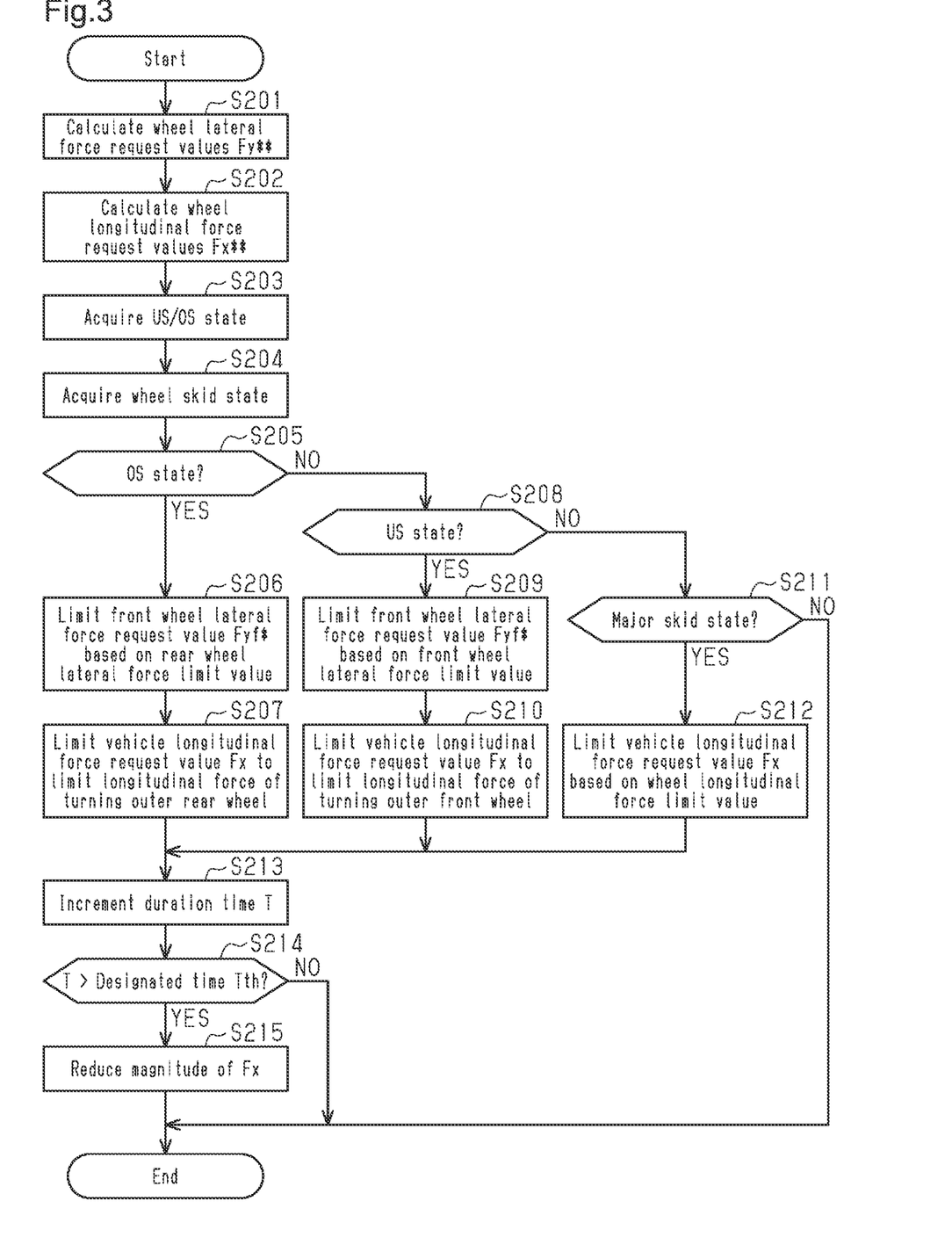
FIG. 3 is a flowchart showing the procedure of processes executed when the vehicle controller shown in FIG. 1 generates a wheel request.

FIG. 2 shows a procedure of processes executed by the controller 10. This processing routine is repeatedly executed at a specific interval during the execution of the assistance control.

When this processing routine is started, the controller 10 first acquires the travel request output by the driver assistance device 20 in step S101. For example, the controller 10 acquires a target value of the yaw rate, a target value of the longitudinal acceleration, and a priority degree. Thereafter, the controller 10 advances the process to step S102.

In step S102, the controller 10 causes the state quantity calculating unit 11 to calculate vehicle state quantities. Thereafter, the controller 10 advances the process to step S103.

In step S103, the controller 10 causes the control request generating unit 12 to generate vehicle requests. For example, the control request generating unit 12 calculates the vehicle longitudinal force request value Fx and the request moment Mz. Thereafter, the controller 10 advances the process to step S104.

In step S104, the controller 10 causes the wheel request generating unit 13 to execute the wheel request generating process so as to generate wheel requests. The wheel request generating unit 13 calculates the wheel longitudinal force request values $Fx^{}$ and the wheel lateral force request values $Fy^{}$. The wheel request generating process will be described in detail below. Thereafter, the controller 10 advances the process to step S105.

In step S105, the controller 10 causes the instruction value generating unit 14 to generate instruction values. After generating the instruction values, the instruction value generating unit 14 outputs the instruction values to the processing circuitry of each system. As a result, each system operates the corresponding actuator in accordance with the instruction value. Thus, the vehicle 90 is caused to travel in accordance with the travel request. After causing the instruction value generating unit 14 to generate the instruction values, the controller 10 ends the current processing routine.

<Wheel Request Generating Process>

FIG. 3 shows a procedure of processes executed by the wheel request generating unit 13. This processing routine is performed by the process of step S104 shown in FIG. 2.

When this processing routine is started, the wheel request generating unit 13 first calculates the wheel lateral force request values $Fy^{}$ in step S201. For example, the wheel request generating unit 13 divides the request moment Mz among the respective wheels so as to calculate the wheel lateral force request values $Fy^{}$. An example of the division ratio is a specified value. The division ratio may be changed depending on the state of execution of controls related to the lateral force of each wheel, such as the electric power steering control, the rear wheel steering control, and the direct yaw moment control. After calculating the wheel lateral force request values $Fy^{**}$, the wheel request generating unit 13 advances the process to step S202.

In step S202, the wheel request generating unit 13 calculates the wheel longitudinal force request values $Fx^{}$. For example, the wheel request generating unit 13 divides the vehicle longitudinal force request value Fx among the respective wheels so as to calculate the wheel longitudinal force request values $Fx^{}$. An example of the division ratio is a specified value. The division ratio may be changed depending on the state of execution of the control related to the longitudinal force of each wheel, such as the sideslip preventing function. For example, when the sideslip preventing function is failing, the division ratio is set to the specified value. After calculating the wheel longitudinal force request values $Fx^{**}$, the wheel request generating unit 13 advances the process to step S203.

In step S203 and step S204, which is subsequent to step S203, the wheel request generating unit 13 acquires information related to the behavior of the vehicle 90.

In step S203, for example, the wheel request generating unit 13 determines whether the behavior of the vehicle 90 is in an oversteer state and whether the behavior of the vehicle 90 is in an understeer state based on the state quantities of the vehicle 90. Hereinafter, the oversteer state may be referred to as an OS state. The understeer state may be referred to as an US state.

Figure 4:
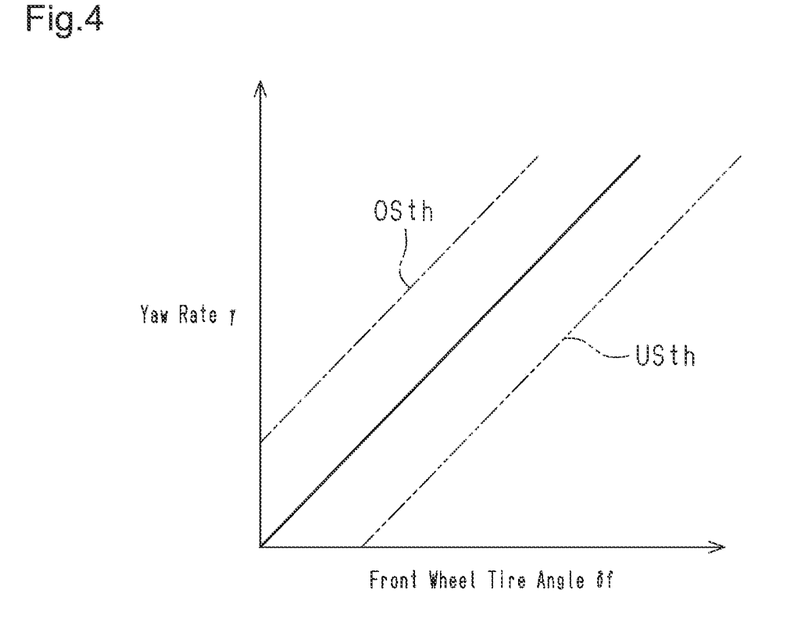
FIG. 4 is a graph showing a relationship between a front wheel tire angle and a yaw rate, the graph being used by the vehicle controller shown in FIG. 1 to determine the behavior of the vehicle.

An example of a method of determining whether the behavior of the vehicle 90 is in an OS state and whether the behavior of the vehicle 90 is in an US state will be described with reference to FIG. 4. The solid line shown in FIG. 4 represents the relationship between the front wheel tire angle δf and the yaw rate γ when the behavior of the vehicle 90 is stable. The long-dash short-dash line in FIG. 4 represents an OS threshold OSth. The OS threshold OSth is obtained by offsetting the solid line in FIG. 4. The OS threshold OSth is set such that the value of the yaw rate γ corresponding to the front wheel tire angle δf is greater on the OS threshold OSth than on the relationship represented by the solid line. The long-dash double-short-dash line in FIG. 4 represents a US threshold USth. The US threshold USth is obtained by offsetting the solid line shown in FIG. 4. The US threshold USth is set such that the value of the yaw rate γ corresponding to the front wheel tire angle δf is smaller on the US threshold USth than on the relationship represented by the solid line. The relationships represented by the solid line, the long-dash short-dash line, and the long-dash double-short-dash line are determined in advance through experiments or the like. The relationship of the OS threshold OSth represented by the long-dash short-dash line with the example represented by the solid line may be changed in accordance with the stat of the vehicle 90 during traveling. For example, this relationship may be changed in accordance with the degree of priority included in the travel request. Likewise, the relationship of the US threshold USth represented by the long-dash double-short-dash line with the example represented by the solid line may be changed.

A calculation map showing the relationship as illustrated in FIG. 4 is stored in the controller 10, for example. When the yaw rate γ is greater than the OS threshold OSth at a calculated value of the front wheel tire angle δf, the wheel request generating unit 13 determines that the vehicle is in the OS state based on the calculation map. In other words, when the yaw rate γ is greater than the OS threshold OSth at a certain value of the front wheel tire angle δf, a vehicle state quantity indicates that the behavior of the vehicle 90 is in the OS state. When the yaw rate γ is less than the US threshold USth at a calculated value of the front wheel tire angle δf, the wheel request generating unit 13 determines that the vehicle is in the US state based on the calculation map. In other words, when the yaw rate γ is less than the US threshold USth at certain value of the front wheel tire angle δf, a vehicle state quantity indicates that the behavior of the vehicle 90 is in the US state.

If the sideslip preventing function is activated, the vehicle 90 is controlled in a direction in which a behavior such as the OS state or the US state is restricted. Therefore, when the yaw rate γ in relation to the front wheel tire angle δf exceeds the OS threshold OSth or falls below the US threshold USth, the sideslip preventing function may be failing. The calculation map showing the relationship as illustrated in FIG. 4 allows for determination as to whether the sideslip preventing function has is failing.

Referring back to FIG. 3, after executing the process of step S203, the wheel request generating unit 13 advances the process to step S204. In step S204, the wheel request generating unit 13 acquires a skid state of the wheels. For example, the wheel request generating unit 13 determines whether the wheel is in a major skid state. The major skid state refers to a state in which the skid amount of the wheels is excessive.

Figure 5:
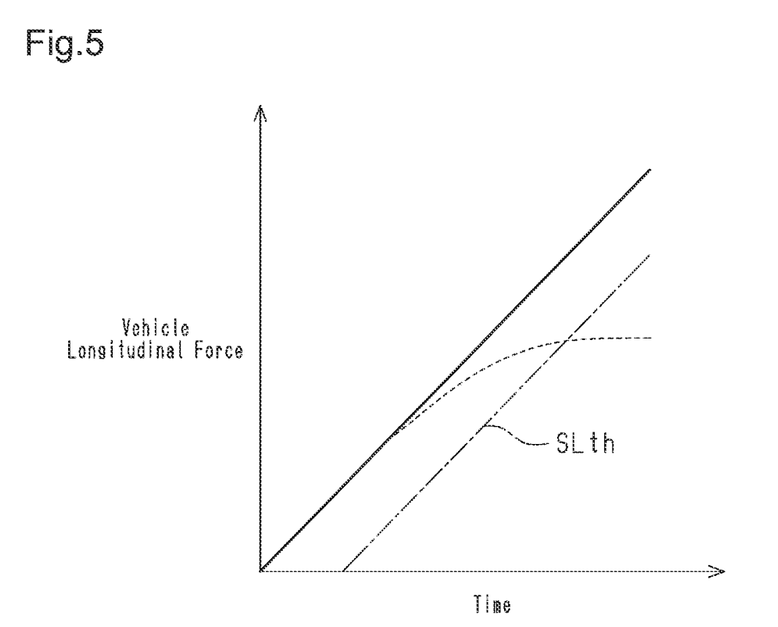
FIG. 5 is a graph for explaining a threshold of a vehicle longitudinal force, the graph being used by the vehicle controller shown in FIG. 1 to determine the behavior of the vehicle.

With reference to FIG. 5, an example of a method of determining whether the wheels are in the major skid state will be described. The solid line shown in FIG. 5 is an example showing temporal changes in the vehicle longitudinal force request value Fx. The long-dash short-dash line in FIG. 5 represents a major skid threshold SLth. The major skid threshold SLth is obtained by offsetting the solid line in a direction in which time elapses. The offset amount is preferably calculated in advance through experiments or the like. The offset amount may be changed in accordance with the state of the vehicle 90 during traveling. For example, the offset amount may be changed in accordance with the degree of priority included in the travel request. The broken line shown in FIG. 5 illustrates the vehicle longitudinal force estimated from the actual longitudinal acceleration Gx of the vehicle 90. In the example shown in FIG. 5, the broken line deviates from the vehicle longitudinal force request value Fx shown by the solid line in a direction in which the vehicle longitudinal force decreases with the elapse of time. When the estimated vehicle longitudinal force represented by the broken line is less than the major skid threshold SLth, the wheel request generating unit 13 determines that the vehicle is in the major skid state. In other words, the wheel request generating unit 13 determines that the vehicle is in the major skid state when the vehicle longitudinal force estimated from the actual longitudinal acceleration Gx deviates greatly from the vehicle longitudinal force request value Fx.

Referring back to FIG. 3, when acquiring the information related to the behavior of the vehicle 90 in step S203 and step S204, the wheel request generating unit 13 advances the process to step S205.

In step S205, if the behavior of the vehicle 90 is in the OS state (S205: YES), the wheel request generating unit 13 advances the process to step S206.

In step S206, the wheel request generating unit 13 limits a front wheel lateral force request value Fyf* based on a rear wheel lateral force limit value. As an example, the wheel request generating unit 13 limits the front wheel lateral force request value Fyf* to a magnitude less than or equal to a first lateral force limit value Ly1. The first lateral force limit value Ly1 is calculated, for example, as follows.

First, the rear wheel lateral force limit value will be described. The rear wheel lateral force limit value is a limit value of the lateral force that can act on the rear wheels 60R. For each wheel, the limit value of the longitudinal force and the limit value of the lateral force can be calculated based on the equation of the friction circle. The size of a friction circle is determined by the product of the road surface friction coefficient μ and the vertical load w. The wheel longitudinal force limit value corresponds to the maximum value of the magnitude of the longitudinal force in a range in which the resultant force of the longitudinal force and the lateral force does not exceed the friction circle. The wheel lateral force limit value corresponds to the maximum value of the magnitude of the lateral force in a range in which the resultant force of the longitudinal force and the lateral force does not exceed the friction circle. The wheel longitudinal force limit value is expressed by the following relational expression (Expression 1). The wheel lateral force limit value is expressed by the following relational expression (Expression 2).

$$|Fx^{}\mathrm{lim}|=\sqrt{(\mu^{}w^{})^2-Fy^{2}} \quad \text{(Expression 1)}$$

$$|Fy^{}\mathrm{lim}|=\sqrt{(\mu^{}w^{})^2-Fx^{2}} \quad \text{(Expression 2)}$$

For example, a left front wheel longitudinal force limit value |Fxfllim| is calculated based on the relational expression (Expression 1) using a road surface friction coefficient μfl, a vertical load wfl, and a left front wheel lateral force request value Fyfl.

The wheel request generating unit 13 calculates the first lateral force limit value Ly1 based on the following relational expression (Expression 3) using a rear wheel lateral force limit value |Fyr*lim|.

$$Ly1=lf/lr|Fyr^*\mathrm{lim}| \quad \text{(Expression 3)}$$

$$Ly2=|Fyf^*\mathrm{lim}| \quad \text{(Expression 4)}$$

The rear wheel lateral force limit value |Fyr*lim| in the relational expression (Expression 3) is calculated based on the relational expression (Expression 2). The symbol if in the relational expression (Expression 3) denotes a front axle wheelbase. The front axle wheelbase is the horizontal distance in the longitudinal direction between the center of gravity of the vehicle 90 and the axle to which the front wheels 60F are attached. The symbol lr denotes a rear axle wheelbase. The rear axle wheelbase is the horizontal distance in the longitudinal direction between the center of gravity of the vehicle 90 and an axle to which the rear wheel 60R are attached. The sum of the front axle wheelbase and the rear axle wheelbase corresponds to the wheelbase of the vehicle 90.

In step S206, the wheel request generating unit 13 calculates the rear wheel lateral force limit value |Fyr*lim|, and calculates the first lateral force limit value Ly1 based on the rear wheel lateral force limit value |Fyr*lim|. When the magnitude of the front wheel lateral force request value Fyf* calculated in step S201 is greater than the first lateral force limit value Ly1, the wheel request generating unit 13 corrects the front wheel lateral force request value Fyf*. In this case, the wheel request generating unit 13 corrects the front wheel lateral force request value Fyf* such that the magnitude of the front wheel lateral force request value Fyf* becomes less than or equal to the first lateral force limit value Ly1. An example of the corrected front wheel lateral force request value Fyf* is equal to the first lateral force limit value Ly1. As a result, the tire angle of the front wheels 60F is adjusted in accordance with an instruction value calculated from the front wheel lateral force request value Fyf*. After calculating the front wheel lateral force request value Fyf*, the wheel request generating unit 13 advances the process to step S207.

In step S207, the wheel request generating unit 13 limits the vehicle longitudinal force request value Fx so as to limit the longitudinal force of a turning outer rear wheel. The turning outer rear wheel corresponds to the rear wheel 60R located on the outer side when viewed from a turning center of the vehicle 90 during a turn. For example, when the vehicle 90 moving forward is turning clockwise, the left rear wheel is the turning outer rear wheel.

As an example, the wheel request generating unit 13 reduces the magnitude of the vehicle longitudinal force request value Fx such that the longitudinal force applied to the turning outer rear wheel becomes less than or equal to the first longitudinal force limit value Lx1. The wheel request generating unit 13 sets the first longitudinal force limit value Lx1 to the rear wheel longitudinal force limit value |Fxr*lim| as expressed by the following relational expression (Expression 5).

$$Lx1=|Fxr^*\text{lim}| \quad \text{(Expression 5)}$$

$$Lx2=|Fxf^*\text{lim}| \quad \text{(Expression 6)}$$

$$Lx3=\min(|Fx^{**}\text{lim}|) \quad \text{(Expression 7)}$$

That is, in step S207, the wheel request generating unit 13 calculates the rear wheel longitudinal force limit value |Fxr*lim|, and sets the first longitudinal limit value Lx1 to the rear wheel longitudinal force limit value |Fxr*lim|. Then, taking into consideration the division ratio to the respective wheels described in the process of step S202, the wheel request generating unit 13 reduces the magnitude of the vehicle longitudinal force request value Fx such that the turning outer rear wheel longitudinal force request value is calculated as a value less than or equal to the first longitudinal force limit value Lx1. For example, when the magnitude of the turning outer rear wheel longitudinal force request value is greater than the first longitudinal force limit value Lx1, the magnitude of the vehicle longitudinal force request value Fx is reduced such that the magnitude of the turning outer rear wheel longitudinal force request value becomes less than or equal to the first longitudinal force limit value Lx1. For example, the magnitude of the vehicle longitudinal force request value Fx is reduced such that the magnitude of the turning outer rear wheel longitudinal force request value becomes equal to the first longitudinal force limit value Lx1. The wheel request generating unit 13 reduces the magnitude of the vehicle longitudinal force request value Fx while maintaining the sign (positive or negative) of the vehicle longitudinal force request value Fx.

After limiting the vehicle longitudinal force request value Fx in step S207, the wheel request generating unit 13 advances the process to step S213.

On the other hand, when the behavior of the vehicle 90 is not the OS state in the process of step S205 (S205: NO), the wheel request generating unit 13 advances the process to step S208. If the behavior of the vehicle 90 is in the US state (S208: YES), the wheel request generating unit 13 advances the process to step S209.

In step S209, the wheel request generating unit 13 limits the front wheel lateral force request value Fyf* based on a front wheel lateral force limit value |Fyf*lim|. As an example, the wheel request generating unit 13 limits the front wheel lateral force request value Fyf* to a magnitude less than or equal to a second lateral force limit value Ly2. The front wheel lateral force limit value |Fyf*lim| is expressed by the relational expression (Expression 2) shown above. The wheel request generating unit 13 sets the second lateral force limit value Ly2 to the front wheel lateral force limit value |Fyf*lim|, as expressed by the relational expression (Expression 4) shown above.

That is, in step S209, the wheel request generating unit 13 calculates the front wheel lateral force limit value |Fyf*lim|, and sets the second lateral force limit value Ly2 to the front wheel lateral force limit value |Fyr*lim|. When the magnitude of the front wheel lateral force request value Fyf* calculated in step S201 is greater than the second lateral force limit value Ly2, the wheel request generating unit 13 corrects the front wheel lateral force request value Fyf*. In this case, the wheel request generating unit 13 corrects the front wheel lateral force request value Fyf* such that the magnitude of the front wheel lateral force request value Fyf* becomes less than or equal to the second lateral force limit value Ly2. An example of the corrected front wheel lateral force request value Fyf* is a value equal to the second lateral force limit value Ly2. As a result, the tire angle of the front wheels 60F is adjusted in accordance with an instruction value calculated from the front wheel lateral force request value Fyf*. After calculating the front wheel lateral force request value Fyf*, the wheel request generating unit 13 advances the process to step S210.

In step S210, the wheel request generating unit 13 limits the vehicle longitudinal force request value Fx so as to limit the longitudinal force of a turning outer front wheel. The turning outer front wheel corresponds to the front wheel 60F located on the outer side when viewed from a turning center of the vehicle 90 during a turn. For example, when the vehicle 90 moving forward is turning clockwise, the left front wheel is the turning outer front wheel.

As an example, the wheel request generating unit 13 reduces the magnitude of the vehicle longitudinal force request value Fx such that the longitudinal force applied to the turning outer front wheel becomes less than or equal to the second longitudinal force limit value Lx2. The wheel request generating unit 13 sets the second longitudinal force limit value Lx2 to the front wheel longitudinal force limit value |Fxf*lim| as expressed by the relational expression (Expression 6) shown above.

That is, in step S210, the wheel request generating unit 13 calculates the front wheel longitudinal force limit value |Fxf*lim|, and sets the second longitudinal force limit value Lx2 to the front wheel longitudinal force limit value |Fxr*lim|. Then, taking into consideration the division ratio to the respective wheels described in the process of step S202, the wheel request generating unit 13 reduces the magnitude of the vehicle longitudinal force request value Fx such that the turning outer front wheel longitudinal force request value is calculated as a value less than or equal to the second longitudinal force limit value Lx2. For example, when the magnitude of the turning outer front wheel longitudinal force request value is greater than the second longitudinal force limit value Lx2, the magnitude of the vehicle longitudinal force request value Fx is reduced such that the magnitude of the turning outer front wheel longitudinal force request value becomes less than or equal to the second longitudinal force limit value Lx2. For example, the magnitude of the vehicle longitudinal force request value Fx is reduced such that the magnitude of the turning outer front wheel longitudinal force request value becomes equal to the second longitudinal force limit value Lx2. The wheel request generating unit 13 reduces the magnitude of the vehicle longitudinal force request value Fx while maintaining the sign (positive or negative) of the vehicle longitudinal force request value Fx.

After limiting the vehicle longitudinal force request value Fx in step S210, the wheel request generating unit 13 advances the process to step S213.

On the other hand, when the behavior of the vehicle 90 is not the US state in the process of step S208 (S208: NO), the wheel request generating unit 13 advances the process to step S211. If the behavior of the vehicle 90 is not in the major skid state (S211: NO), the wheel request generating unit 13 ends the current processing routine. If the behavior of the vehicle 90 is in the major skid state (S211: YES), the wheel request generating unit 13 advances the process to step S212.

In step S212, the wheel request generating unit 13 limits the vehicle longitudinal force request value Fx based on the wheel longitudinal force limit value. As an example, the wheel request generating unit 13 limits the vehicle longitudinal force request value Fx such that the wheel longitudinal force request values Fx become less than or equal to a third longitudinal force limit value Lx3. The wheel request generating unit 13 sets the third longitudinal force limit value Lx3 as expressed by the relational expression (Expression 7) shown above. The symbol min in the relational expression (Expression 7) is a function in which the smallest one of arguments is the return value. That is, the minimum value of the wheel longitudinal force limit values |Fxlim| is the third longitudinal force limit value Lx3.

Specifically, in step S212, the wheel request generating unit 13 calculates the wheel longitudinal force limit values |Fxlim|, and sets the third longitudinal force limit value Lx3 to the minimum value of the wheel longitudinal force limit values |Fxlim|. Then, the wheel request generating unit 13 reduces the magnitude of the vehicle longitudinal force request value Fx such that the wheel longitudinal force request values Fx are all less than or equal to the third longitudinal force limit value Lx3. For example, the magnitude of the vehicle longitudinal force request value Fx is reduced such that the magnitude of the maximum value of the wheel longitudinal force request values Fx becomes equal to the third longitudinal force limit value Lx3. The wheel request generating unit 13 reduces the magnitude of the vehicle longitudinal force request value Fx while maintaining the sign (positive or negative) of the vehicle longitudinal force request value Fx.

After limiting the vehicle longitudinal force request value Fx in step S212, the wheel request generating unit 13 advances the process to step S213.

In step S213, the wheel request generating unit 13 increments duration time T. For example, when the process is advanced from step S207, the wheel request generating unit 13 increments the duration time T as the time during which the OS state continues. When the OS state is ended, the wheel request generating unit 13 initializes the duration time T to 0. For example, when the process is advanced from step S210, the wheel request generating unit 13 increments the duration time T as the time during which the US state continues. When the US state is ended, the wheel request generating unit 13 initializes the duration time T to 0. For example, when the process is advanced from step S212, the wheel request generating unit 13 increments the duration time T as the time during which the major skid state continues. When the major skid state is ended, the wheel request generating unit 13 initializes the duration time T to 0. After incrementing the duration time T, the wheel request generating unit 13 advances the process to step S214.

In step S214, the wheel request generating unit 13 determines whether the duration time T is longer than a designated time Tth. If the duration time T is less than or equal to the designated time Tth (S214: NO), the wheel request generating unit 13 ends the current processing routine. If the duration time T is longer than the designated time Tth (S214: YES), the wheel request generating unit 13 advances the process to step S215.

The designated time Tth will now be described. The designated time Tth is a threshold for determining whether the time during which the OS state, the US state, or the major skid state continues without being ended is relatively long. For example, the initial value of the designated time Tth is set to a value calculated in advance through experiments or the like. The wheel request generating unit 13 increases or reduces the designated time Tth. For example, the wheel request generating unit 13 increases or reduces the designated time Tth based on whether the priority degree included in the travel request input from the driver assistance device 20 gives priority to braking of the vehicle 90 or turning of the vehicle 90. As an example, the wheel request generating unit 13 sets the designated time Tth to be longer when braking is prioritized than when turning is prioritized. The amount to be added when the designated time Tth is increased may be changed in accordance with the degree of priority of braking. For example, when the degree of priority of braking is 70%, the designated time Tth may be made longer than when the degree of priority of braking is 60%.

In step S215, the wheel request generating unit 13 further reduces the magnitude of the vehicle longitudinal force request value Fx. Specifically, the wheel request generating unit 13 reduces the vehicle longitudinal force request value Fx to a greater extent when the duration time T is longer than the designated time Tth than when the duration time T is shorter than or equal to the designated time Tth. Thereafter, the wheel request generating unit 13 ends the current processing routine.

In the present embodiment, the controller 10 performs a process of reflecting the vehicle longitudinal force request value Fx, the magnitude of which is reduced in the above-described steps S207, S210, S211, and S215, on the longitudinal force in the following manner. In the present embodiment, the controller 10 reduces the braking force generated by the brake actuator 41, so that the longitudinal force is adjusted through reduction in the magnitude of the vehicle longitudinal force request value Fx. Since the magnitude of the vehicle longitudinal force request value Fx, which is a vehicle request, is reduced, the total of the braking forces applied to the respective wheels is reduced. The method of reducing the braking force in the above-described manner may include reducing the braking force applied to each of the wheels. Specifically, the braking force applied to the vehicle 90 may be reduced by performing the regenerative cooperative control.

<Operation and Advantages>

An operation and advantages of the present embodiment will now be described.

If the vehicle state quantities indicate that the behavior of the vehicle 90 is in the OS state in a case in which the sideslip preventing function is failing (S205: YES), the controller 10 limits the magnitude of a front wheel lateral force request value Fyf* (S206). The tire angle of the front wheels 60F is controlled based on the front wheel lateral force request value Fyf*. The first lateral force limit value Ly1, which limits the magnitude of the front wheel lateral force request value Fyf*, is a limit value of the lateral force that can act on the rear wheels 60R during traveling. Therefore, the lateral force acting on the front wheels 60F of the vehicle 90 in the OS state is limited with reference to the rear wheels 60R of the vehicle 90 in the OS state. Since the tire angle of the front wheels 60F is adjusted in accordance with the front wheel lateral force request value Fyf*, which is limited in the above-described manner, it is possible to reduce the difference between the lateral force of the front wheels 60F and the lateral force of the rear wheels 60R in the vehicle 90 during turning. As a result, it is possible to end the OS state, so as to stabilize the behavior of the vehicle 90.

If the vehicle state quantities indicate that the behavior of the vehicle 90 is in the OS state in a case in which the sideslip preventing function is failing (S205: YES), the controller 10 limits the magnitude of the vehicle longitudinal force request value Fx (S207). Specifically, the longitudinal force applied to the turning outer rear wheel is limited to a value less than or equal to the first longitudinal force limit value Lx1, that is, to a value less than or equal to the limit value of the longitudinal force that can be applied to the rear wheels 60R. As a result, in the vehicle 90 in the OS state, the gripping force of the turning outer rear wheel is ensured by causing the longitudinal force to act on the turning outer rear wheel within a range not exceeding the friction circle. Thus, the behavior of the vehicle 90 is stabilized by ending the OS state.

If the vehicle state quantities indicate that the behavior of the vehicle 90 is in the US state in a case in which the sideslip preventing function is failing (S208: YES), the controller 10 limits the magnitude of the vehicle longitudinal force request value Fx (S210). Specifically, the longitudinal force applied to the turning outer front wheel is limited to a value less than or equal to the second longitudinal force limit value Lx2, that is, to a value less than or equal to the limit value of the longitudinal force that can be applied to the front wheels 60F. As a result, in the vehicle 90 in the US state, the gripping force of the turning outer front wheel is ensured by causing the longitudinal force to act on the turning outer front wheel within a range not exceeding the friction circle. Thus, the behavior of the vehicle 90 is stabilized by ending the US state.

If the vehicle state quantities indicate that the behavior of the vehicle 90 is in the US state in a case in which the sideslip preventing function is failing (S208: YES), the controller 10 limits the magnitude of the front wheel lateral force request value Fyf* (S209). The tire angle of the front wheels 60F is controlled based on the front wheel lateral force request value Fyf*. The second lateral force limit value Ly2, which limits the magnitude of the front wheel lateral force request value Fyf*, is a limit value of the lateral force that can act on the front wheels 60F during traveling. As a result, the gripping force of the front wheels 60F is ensured by applying a large lateral force to the front wheels 60F within a range not exceeding the friction circle. Thus, the behavior of the vehicle 90 is stabilized by ending the US state.

Based on the degree of priority included in the travel request, the controller 10 causes the designated time Tth to be longer when braking is prioritized than when turning is prioritized. As a result, the process of step S215 is not executed unless the duration time T is extended. That is, the magnitude of the vehicle longitudinal force request value Fx is not reduced unless the duration time T is extended. In other words, the magnitude of the vehicle longitudinal force request value Fx is less likely to be decreased when braking is prioritized than when turning is prioritized. Accordingly, the period during which a larger braking force is applied is extended when braking is prioritized.

If the vehicle state quantities indicate that the behavior of the vehicle 90 is in the major skid state in a case in which the sideslip preventing function is failing (S211: YES), the controller 10 limits the magnitude of the vehicle longitudinal force request value Fx (S212). Specifically, the longitudinal force applied to each wheel is limited to a value less than or equal to the third longitudinal force limit value Lx3, that is, to a value less than or equal to the minimum value of the wheel longitudinal force limit values |Fx**lim|. As a result, in the vehicle 90 in the major skid state, the longitudinal force can be applied to each wheel within a range not exceeding the friction circle. Thus, the behavior of the vehicle 90 is stabilized by ending the major skid state.

The sideslip preventing function generates a yaw moment in a direction of ending a state in which the behavior of the vehicle 90 is unstable, such as the OS state, the US state, and the major skid state. Even when a yaw moment in a direction of ending a state in which the behavior of the vehicle 90 is unstable is not expected to be applied to the vehicle 90, the controller 10 ends the unstable behavior to stabilize the behavior of the vehicle 90.

Modifications

The above-described embodiment may be modified as follows. The above-described embodiment and the following modifications can be combined as long as the combined modifications remain technically consistent with each other.

In the above-described embodiment, when the magnitude of the vehicle longitudinal force request value Fx is reduced, the braking force generated by the brake actuator 41 is reduced as a process of reflecting the vehicle longitudinal force request value Fx on the longitudinal force. The present disclosure is not limited to this as long as the magnitude of the longitudinal force can be reduced by controlling a longitudinal force actuator. For example, the driving force generated by the drive actuator 31 may be increased such that the longitudinal force approaches 0.

The processes of steps S213 to S215 illustrated in FIG. 3 in the above-described embodiment may be omitted.

The processes of steps S211 and S212 illustrated in FIG. 3 in the above-described embodiment may be omitted. In this case, when a negative determination is made in the process of step S208, the processing routine may be ended.

In the above-described embodiment, the processes of steps S206 and S207 are executed when the vehicle 90 is in the OS state. When the vehicle 90 is in the OS state, at least the process of limiting the front wheel lateral force request value Fyf* based on the rear wheel lateral force limit value may be executed. That is, the process of step S207 may be omitted. Even in this case, the behavior of the vehicle 90 is stabilized by ending the OS state.

In the above-described embodiment, the processes of steps S209 and S210 are executed when the vehicle 90 in the US state. When the vehicle 90 is in the US state, the behavior of the vehicle 90 is stabilized, for example, by executing at least the process of limiting the vehicle longitudinal force request value Fx so as to limit the longitudinal force of the turning outer front wheel. That is, the process of step S209 may be omitted. For example, the behavior of the vehicle 90 is stabilized by executing at least the process of limiting the front wheel lateral force request value Fyf* based on the front wheel lateral force limit value. That is, the process of step S210 may be omitted.

In the above-described embodiment, a case in which the vehicle 90 is moved forward is described. That is, in the above-described embodiment, the front wheels 60F are wheels positioned on the leading side with respect to the traveling direction of the vehicle 90. The wheels positioned on the leading side with respect to the traveling direction are referred to as first wheels. Also, in the above-described embodiment, the rear wheels 60R are wheels positioned on the trailing side with respect to the traveling direction of the vehicle 90. The wheels positioned on the trailing side with respect to the traveling direction are referred to as second wheels. The control for the front wheels 60F in the above-described embodiment can be regarded as a control for the first wheels. The control for the rear wheels 60R in the above-described embodiment can be regarded as a control for the second wheels.

A case in which the vehicle 90 is moved backward will be considered. In this case, the wheels positioned on the leading side with respect to the traveling direction of the vehicle 90 are the wheels attached to the rear part of the vehicle 90, that is, the rear wheels 60R. The rear wheels 60R correspond to the first wheels. Likewise, the wheels positioned on the trailing side with respect to the traveling direction of the vehicle 90 are the wheels attached to the front part of the vehicle 90, that is, the front wheels 60F. The front wheels 60F correspond to the second wheels.

Even when the assistance control according to the above-described embodiment is performed in a case in which the vehicle 90 is caused to travel in the reverse direction, the same advantages as the case in which the vehicle 90 is caused to travel in the forward direction are achieved by performing the control for the first wheels and the control for the second wheels.

The controller 10, the drive controller, the braking controller, the steering controller, and the driver assistance device 20, which are processing circuitry, may have any one of the configurations [a] to [c] listed below.

[a] Circuitry including one or more processors that execute various processes according to computer programs. The processor includes a processing device. Examples of the processing device include a CPU, a digital signal processor (DSP), and a graphics processing unit (GPU). The processor includes a memory. Examples of the memory include a random-access memory (RAM), a ROM, and a flash memory. The memory stores program codes or instructions configured to cause the processing device to execute processes. The memory, which is a computer-readable medium, includes any type of media that are accessible by general-purpose computers and dedicated computers.

[b] Circuitry including one or more hardware circuits that execute various processes. Examples of the hardware circuit include an application specific integrated circuit (ASIC), a complex programmable logic device (CPLD), and a field programmable gate array (FPGA).

[c] Circuitry including a processor that executes part of various processes according to programs and a hardware circuit that executes the remaining processes.

The controller 10 may implement part or all of the functions implemented by the processing circuitry in the drive controller, the braking controller, the steering controller, and the driver assistance device 20.

Part of the functions implemented by the controller 10 may be implemented by other processing circuitry connected to the controller 10.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A vehicle controller configured to control a vehicle based on a request input from a driver assistance device that assists traveling of the vehicle, thereby causing the vehicle to travel autonomously, wherein
the vehicle includes:
the driver assistance device;
wheels including front wheels and rear wheels;
a drive actuator and a brake actuator that generate a longitudinal force that acts in a longitudinal direction of the vehicle; and
a steering actuator that adjusts a tire angle, the tire angle being a steered angle of each of the wheels,
the vehicle controller includes:
a state quantity calculating unit configured to calculate state quantities including a yaw rate of the vehicle;
a wheel request generating unit configured to calculate wheel lateral force request values based on the request, the wheel lateral force request values being request values of lateral forces acting on the respective wheels; and
an instruction value generating unit configured to output an instruction value that controls the steering actuator based on the wheel lateral force request values,
the vehicle includes a sideslip preventing function of preventing a sideslip of the vehicle by separately adjusting a longitudinal force applied to each of the wheels, and
the wheel request generating unit is configured to, when the state quantities indicate that a behavior of the vehicle is in an oversteer state in a case in which the sideslip preventing function is failing,
calculate a first lateral force limit value, which is a limit value of a lateral force that can act on the rear wheels, and
limit a front wheel lateral force request value to a magnitude less than or equal to the first lateral force limit value, the front wheel lateral force request value being the wheel lateral force request value for the front wheels.

2. The vehicle controller according to claim 1, further comprising a control request generating unit configured to calculate a vehicle longitudinal force request value based on the request, the vehicle longitudinal force request value being a request value of a longitudinal force acting on the vehicle, wherein
 the wheel request generating unit is configured to calculate, based on the vehicle longitudinal force request value, wheel longitudinal force request values for the respective wheels,
 the instruction value generating unit is configured to output, based on the wheel longitudinal force request values, an instruction value that controls the drive actuator and an instruction value that controls the brake actuator,
 the wheel request generating unit is configured to, when the state quantities indicate that the behavior of the vehicle is in an oversteer state in a case in which the sideslip preventing function is failing,
  calculate a first longitudinal force limit value, which is a limit value of a longitudinal force that can act on the rear wheels, and
  reduce a magnitude of the vehicle longitudinal force request value such that a magnitude of a longitudinal force acting on a turning outer rear wheel becomes less than or equal to the first longitudinal force limit value, and
 the turning outer rear wheel is one of the rear wheels that is located on an outer side when viewed from a turning center of the vehicle during a turn.

3. The vehicle controller according to claim 2, wherein
 the wheel request generating unit is configured to, when the state quantities indicate that the behavior of the vehicle is in an understeer state in a case in which the sideslip preventing function is failing,
  calculate a second longitudinal force limit value, which is a limit value of a longitudinal force that can act on the front wheels, and
  reduce a magnitude of the vehicle longitudinal force request value such that a magnitude of a longitudinal force acting on a turning outer front wheel becomes less than or equal to the second longitudinal force limit value, and
 the turning outer front wheel is one of the front wheels that is located on an outer side when viewed from a turning center of the vehicle during a turn.

4. The vehicle controller according to claim 1, wherein
 the wheel request generating unit is configured to, when the state quantities indicate that the behavior of the vehicle is in an understeer state in a case in which the sideslip preventing function is failing,
  calculate a second lateral force limit value, which is a limit value of a lateral force that can act on the front wheels, and
  limit the front wheel lateral force request value to a magnitude less than or equal to the second lateral force limit value.

5. The vehicle controller according to claim 2, wherein the wheel request generating unit is configured to
 cause the magnitude of the vehicle longitudinal force request value to be smaller when a duration time is longer than a designated time than when the duration time is shorter than or equal to the designated time, the duration time being a time period during which the state quantities indicate that the behavior of the vehicle is in an oversteer state or an understeer state, and
 cause the designated time to be longer when braking of the vehicle is prioritized than when turning of the vehicle is prioritized, based on whether the request from the driver assistance device prioritizes the braking or the turning.

6. A non-transitory computer-readable medium storing a vehicle control program, the vehicle control program causing a controller of a vehicle to execute an assistance control that controls the vehicle based on a request output by a driver assistance device that assists traveling of the vehicle, thereby causing the vehicle to travel autonomously, wherein
 the vehicle includes:
  the driver assistance device;
  wheels including front wheels and rear wheels;
  a drive actuator and a brake actuator that generate a longitudinal force that acts in a longitudinal direction of the vehicle; and
  a steering actuator that adjusts a tire angle, the tire angle being a steered angle of each of the wheels,
 the vehicle includes a sideslip preventing function of preventing a sideslip of the vehicle by separately adjusting a longitudinal force applied to each of the wheels,
 the vehicle control program is configured to cause the controller to execute:
  a state quantity calculating process that calculates state quantities including a yaw rate of the vehicle;
  a wheel request generating process that calculates wheel lateral force request values based on the request, the wheel lateral force request values being request values of lateral forces acting on the respective wheels; and
  an instruction value generating process that outputs an instruction value that controls the steering actuator based on the wheel lateral force request values,
 the wheel request generating process includes, when the state quantities indicate that a behavior of the vehicle is in an oversteer state in a case in which the sideslip preventing function is failing,
  calculating a first lateral force limit value, which is a limit value of a lateral force that can act on the rear wheels, and
  limiting a front wheel lateral force request value to a magnitude less than or equal to the first lateral force limit value, the front wheel lateral force request value being the wheel lateral force request value for the front wheels.

7. A vehicle control method that controls a vehicle based on a request output by a driver assistance device that assists traveling of the vehicle, thereby causing the vehicle to travel autonomously, wherein
 the vehicle includes:
  the driver assistance device;
  wheels including front wheels and rear wheels;
  a drive actuator and a brake actuator that generate a longitudinal force that acts in a longitudinal direction of the vehicle; and
  a steering actuator that adjusts a tire angle, the tire angle being a steered angle of each of the wheels,
 the vehicle includes a sideslip preventing function of preventing a sideslip of the vehicle by separately adjusting a longitudinal force applied to each of the wheels,
 the vehicle control method comprises:
  a state quantity calculating process that calculates state quantities including a yaw rate of the vehicle;

a wheel request generating process that calculates wheel lateral force request values based on the request, the wheel lateral force request values being request values of lateral forces acting on the respective wheels; and an instruction value generating process that outputs an instruction value that controls the steering actuator based on the wheel lateral force request values, and the wheel request generating process includes, when the state quantities indicate that a behavior of the vehicle is in an oversteer state in a case in which the sideslip preventing function is failing, calculating a first lateral force limit value, which is a limit value of a lateral force that can act on the rear wheels, and limiting a front wheel lateral force request value to a magnitude less than or equal to the first lateral force limit value, the front wheel lateral force request value being the wheel lateral force request value for the front wheels.

* * * * *